3,320,190
POLYURETHANES PREPARATION UTILIZING PIPERIDINE COMPOUNDS AS CATALYSTS
Dennis Charlton Allport, George Albert Gamlen, and John Anthony Corran, Runcorn, and David Crawford Eaton and Harry James Twitchett, Manchester, England, assignors to Imperial Chemical Industries Limited, London, England, a corporation of Great Britain
No Drawing. Filed Jan. 27, 1966, Ser. No. 523,269
Claims priority, application Great Britain, Feb. 3, 1965, 4,682/65
7 Claims. (Cl. 260—2.5)

This invention relates to tertiary amines and particularly to their use as catalysts in the manufacture of polyurethane materials.

It has already been proposed to manufacture polyurethane materials by reacting organic polyisocyanates and organic polyhydroxy compounds and to use tertiary amines as catalysts for the reaction. Tertiary amines vary considerbly in their suitability as catalysts for this reaction, some being much more active than others. The catalytic activity of any particular amine cannot be accurately predicted since there is no simple relationship, for example, between catalytic activity and base strength. Structural factors, other than those which influence base strength, are believed to influence catalytic activity. Where an organic polyisocyanate and an organic polyhydroxy compound are the only reactive materials present, a wide variety of tertiary amines may be employed as catalysts although it is usually desirable to use those which have greatest effect. A further complication arises when water is included in the reaction mixture as is often the case in the manufacture of polyurethane foams. A number of reactions then take place simultaneously, the principal ones being the urethane-forming reaction between the polyisocyanate and the polyhydroxy compound and the reaction between polyisocyanate and water which results in the evolution of carbon dioxide. In such a system it is a necessary function of the catalyst to keep these two reactions in balance. This object may be achieved without excessive difficulty being experienced when the polyhydroxy compounds contain primary hydroxyl groups. In the case of the less reactive secondary hydroxyl group-containing polyhydroxy compounds, the majority of tertiary amines such as triethylamine and N-ethylmorpholine fail to catalyse the urethane-forming reaction sufficiently and the carbon dioxide escapes from the reaction mixture before the necessary degree of polymerisation has been achieved.

The present invention provides a process for the manufacture of polyurethane materials by the reaction of an organic polyisocyanate with an organic polyhydroxy compound characterised in that the reaction is carried out in the presence of a tertiary amine of the general formula:

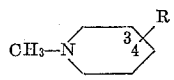

wherein R, which is attached to a carbon atom in the 3 or 4 position of the piperidine ring, represents a 2'-, 3'-, or 4'-pyridyl or a 1'-methyl-2'-, 1'-methyl-3'- or 1'-methyl-4'-piperidyl radical.

The tertiary amines used in the process of the present invention may be made in good yield by known processes such as hydrogenation of bipyridyls to bipiperidyls which are subsequently methylated on the N atoms of the piperidyl nuclei to provide the catalyst, or by the hydrogenation of bipyridyls by methods whereby only one nucleus is reduced. Other suitable methods are described in the prior art.

Those amines which contain two piperidine nuclei have been described previously: the compounds containing a 1-methylpiperidine nucleus substituted in the 3 or 4 position by a pyridyl radical are believed to be new but may be prepared by methods analogous to those used in the preparation of the known amines.

The tertiary amines used in accordance with the present invention may be incorporated in polyurethane-forming reaction mixtures without difficulty. Their water-solubility is often such that they can be incorporated as aqueous solutions when used in polyurethane systems of which water is one of the ingredients. In some cases, however, organic solvents such as dipropylene glycol may be preferred. Because of their low volatility the amines are not unpleasant to use and do not confer undesirable odors upon the derived polyurethane products as do, for example, amines such as N-methylpiperidine.

Examples of tertiary amines suitable for use in the process of the present invention include 1,1'-dimethyl-4,4'-bipiperidyl, 1-methyl-4(4'-pyridyl)piperidine, 1,1'-dimethyl-4,3'-bipiperidyl, 1,1'-dimethyl-4,2'-bipiperidyl, 1-methyl-4-(3'-pyridyl)-piperidine and 1-methyl-3-(4-pyridyl)piperidine.

In the process of the present invention, the tertiary amines are used in catalytic amounts, that is in amounts sufficient to catalyse the polyurethane reaction to a significant extent. Suitable quantities are normally between 0.01% and 5% and preferably between 0.05% and 1.0% by weight of the organic polyhydroxy compound. The optimum proportions, however, will necessarily depend to a considerable extent upon the particular reaction components and conditions employed and may not always fall within the aforesaid normal ranges of proportions.

Whilst it is normally preferred to use the catalysts of the present invention as the free tertiary amines they may, if desired, be used in the form of salts of weak acids. Suitable weak acids are, for example, formic, acetic, lauric, methacrylic, oleic, oxalic, adipic, maleic, citric, phenylacetic, benzoic, salicyclic and terephthalic acids. The amines may be used in the form of neutral salts, the amine and acid being present in equivalent proportions or, alternatively a deficiency or an excess of the acid may be used. The tertiary amine salts may be added to the polyurethane-forming reaction mixture as such or, alternatively, the salts may be formed in situ by adding the amine and the acid to the reaction mixture separately.

The starting materials to be used in the process of the present invention may be those fully described in the prior art relating to the manufacture of polyurethanes.

Examples of suitable organic polyisocyanates include aliphatic diisocyanates such as hexamethylene diisocyanate, aromatic diisocyanates such as tolylene-2,4-diisocyanate, tolylene-2,6-diisocyanate, diphenylmethane-4,4'-diisocyanate, 3 - methyldiphenylmethane - 4' - diisocyanate, m- and p-phenylene diisocyanates, chlorophenylene-2,4-diisocyanate, naphthalene-1,5-diisocyanate, diphenyl-4,4''-diisocyanate, 3,3'-dimethyldiphenyl-4,4'-diisocyanate, or diphenyl ether diisocyanate and cycloaliphatic diisocyanates such as dicyclohexylmethane diisocyanate. Triisocyanates which may be used include aromatic triisocyanates such as 2,4,6-triisocyanatotoluene, and 2,4,4'-triisocyanatodiphenylether. Examples of other suitable organic polyisocyanates comprise the reaction products of an excess of a diisocyanate with polyhydric alcohols such as trimethylolpropane and uretedione dimers and isocyanurate polymers of diisocyanates, for example, of tolylene-2,4-diisocyanate. Mixtures of polyisocyanates may be used. Examples of suitable mixtures include mixtures of tolylene-2,4- and 2,6-diisocyanates and the polyisocyanate compositions obtained by the phosgenation of the mixed polyamine reaction products of formaldehyde and aromatic amines such as aniline and orthotoluidine.

Suitable polyhydroxy compounds include hydroxyl group-containing polyesters, polyesteramides, polyethers and non-polymeric oxyalkylation products of active hydrogen-containing compounds.

The polyesters or polyesteramides may be made for example from dicarboxylic acids and polyhydric alcohols, and, as necessary, minor proportions of diamines or aminoalcohols. Suitable dicarboxylic acids include succinic, glutaric, adipic, suberic, azelaic and sebacic acids as well as aromatic acids such as phthalic, isophthalic and terephthalic acids. Mixtures of acids may be used. Examples of polyhydric alcohols include glycols such as ethylene glycol, 1,2-propylene glycol, 1,3-butylene glycol, 2,3-butylene glycol, diethylene glycol, tetramethylene glycol, and 2,2-dimethyltrimethylene glycol. Other polyhydric alcohls containing more than two hydroxyl groups per molecule may be used, for example trimethylolpropane and other hexanetriols, trimethylolethane, pentaerythritol and glycerol. Such compounds are included in varying amounts according to the desired rigidity of the polyurethane products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxystearic acid and tricarballylic acid.

Examples of diamines and aminoalcohols that may be used to make polyesteramides include ethylene diamine, hexamethylene diamine, monoethanolamine, phenylene diamines and tolylene diamines.

The polyesters and polyesteramides normally have molecular weights of from 200 to 5000, with predominantly primary hydroxyl end groups.

As examples of polyethers for use in the production of the polyurethane materials there may be mentioned hydroxyl-ended polymers and co-polymers of cyclic oxides, for example 1,2-alkylene oxides such as ethylene oxide, epichlorohydrin, 1,2-propylene oxide, 1,2-butylene oxide and 2,3-butylene oxide, oxacyclobutane and substituted oxacyclobutanes, and tetrahydrofuran. Such polyethers may be linear polyether glycols as are prepared, for example by the polymerisation of an alkylene oxide in the presence of a basic catalyst such as potassium hydroxide and a glycol or a primary monoamine. Alternatively, there may be used branched polyethers prepared for example by the polymerisation of an alkylene oxide in the presence of a basic catalyst and a substance having more than two active hydrogen atoms per molecule, for example ammonia, hydrazine and polyhydroxy compounds such as glycerol, trimethylolpropane and other hexanetriols, trimethylolethane, triethanolamine, pentaerythritol, sorbitol, sucrose and phenol-formaldehyde reaction products, aminoalcohols such as monoethanolamine and diethanolamine, and polyamines such as ethylene diamine, tolylene diamine and diaminodiphenylmethane. Branched polyethers may also be produced by copolymerising a cyclic oxide of the type already mentioned with cyclic oxides having a functionality greater than two, for example diepoxides, glycidol and 3-hydroxymethyloxacyclobutane.

The polyethers normally have molecular weights of from 200 to 8000. Mixtures of linear and branched polyethers may be used if desired.

The non-polymeric oxyalkylation products of active hydrogen-containing compounds which may be used in the production of the polyurethane materials are polyhydroxy compounds in which the degree of oxyalkylation is insufficiently high for the compounds to contain a plurality of ether groups. In particular there may be mentioned the non-polymeric oxyalkylation products of primary and secondary polyamines such as, for example, the reaction products of tolylene diamine with up to 5 moles per mole of alkylene oxide.

Mixtures of polyhydroxy compounds may be used if desired.

It has been found that the process of the present invention is especially advantageous when applied to the manufacture of foamed polyurethane materials wherein an organic polyisocyanate is reacted with an organic polyhydroxy compound under such conditions that a foam-forming gas is generated.

The foam-forming gas may be generated by a variety of methods. For example the gas may be carbon dioxide generated by the reaction of a proportion of the organic polyisocyanate with water incorporated in the reaction mixture. Alternatively the gas may be generated by incorporating in the reaction mixture a suitable low boiling liquid which, when the reaction mixture heats or is heated above the boiling point of the said liquid, volatilises to give the foam forming gas. Combinations of methods, for example of the above two methods, may be used.

Water is usually employed in amounts of from 1% to 10% by weight of the polyhydroxy compound when used as a gas-generating agent.

Suitable low boiling point liquids are liquids that are inert towards the polyurethane foam-forming ingredients and have boiling points not exceeding 75° C. at atmospheric pressure and preferably between —40° C. and 50° C. Examples of such liquids are halogenated hydrocarbons such as methylene chloride, trichloromonofluoromethane, dichlorodifluoromethane, dichloromonofluoromethane, monochlorodifluoromethane, dichlorotetrafluoroethane, 1,1,2-trichloro-1,2,2-trifluoroethane, dibromodifluoromethane and monobromotrifluoroethane. Mixtures of these low boiling point liquids one with another and/or with other substituted or unsubstituted hydrocarbons may also be used. Such liquids are usually employed in amounts of from 1% to 100% preferably 5% to 50% by weight of the polyhydroxy compound.

The preparation of the foamed, cellular polyurethanes may be carried out by the general methods fully described in the prior art. Thus the materials may be mixed continuously or discontinuously and the organic polyhydroxy compound may be first reacted with a part or the whole of the organic polyisocyanate before the final reaction to give a foam is carried out in a second stage. However, it is generally preferred to carry out the foam preparation in one stage only, by the simultaneous reaction of the foam-forming ingredients, namely the organic polyhydroxy compound, the organic polyisocyanate and, for example, water. This convenient one-stage process cannot always be satisfactorily carried out with all organic polyhydroxy compounds. In particular those compounds containing predominantly secondary hydroxyl groups do not normally give satisfactory foam using a one-stage process unless particular catalysts are employed.

It has now been found that highly attractive low density foamed cellular polyurethane materials may be obtained from compounds having predominantly secondary hydroxyl groups by a one-stage process by including in the reaction mixture a tertiary amine of the formula:

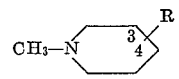

where R has the significance hereinbefore stated.

Examples of predominantly secondary hydroxyl group-containing polyhydroxy compounds include polyesters and polyesteramides prepared from an excess of polyhydric alcohol and amino compounds over dicarboxylic acid, wherein the polyhydric alcohol contains secondary hydroxyl groups, for example propylene glycol, 1,3-butylene glycol or glycerol. Secondary hydroxyl-ended polyethers include polymers and copolymers of substituted 1,2-alkylene oxides such as propylene and butylene oxides. It is preferred to use predominantly secondary hydroxyl-ended polymers of propylene oxide, especially those with molecular weights of from 400 to 6000.

In the preparation of foamed polyurethanes it is found that the tertiary amines proposed herein can usually be employed at lower concentrations than the tertiary amine catalysts previously proposed. Furthermore the derived foams are characterized by more rapid surface cure than foams made with other tertiary amine catalysts such as triethylene diamine.

Whilst the tertiary amines herein proposed as catalysts are extremely effective and may be used as the sole catalytic entity in polyurethane-forming systems it is common practice especially in the production of foamed polyurethanes to employ more than one catalyst. In particular it is common practice to use one or more tertiary amines in conjunction with an organic compound of a metal. Organic metal compounds which may be used include tin compounds, for example stannous octoate, dibutyltin dilaurate and dibutyltin diacetate, lead compounds, for example, lead acetate and lead octoate and coordination compounds of the transistion metals, for example, the acetylacetonates of iron and manganese. The use of an organic metal compound as a catalyst in polyurethane manufacture does not make the choice of amine catalyst less critical. Many of the tertiary amines described in the prior art, when used in conjunction with organic metal compounds, provide catalytic combinations which are insufficiently effective for many purposes, particularly for single stage polyurethane foam preparations. It has now been found that excellent results may be obtained by using the tertiary amines proposed herein in conjunction with organic metal compounds and particularly stannous octoate, dibutyltin dilaurate or lead octoate.

Other tertiary amines amy be used together with the tertiary amines proposed herein, optionally in the presence of an organic metal compound. Examples of suitable tertiary amines include triethylamine, dimethylethylamine, dimethylbenzylamine, dimethylcyclohexylamine, dimethylphenylethylamine, tetramethyl - 1,3 - butanediamine, triethylene diamine, N-akylmorpholines, N-alkylpyrrolidines, N-alkylpiperidines, N-($\beta$-dimethylaminoethyl)-N'-methylpiperazine, pyrrolizidine, $\beta$-dimethylaminopropionamide and fully N-substituted 4-aminopyridines such as 4-dimethylaminopyridine. Amine salts such as dimethylbenzylamine lactate are also suitable.

As described fully in the prior art, the general methods of preparation of polyurethanes may include the incorporation in the polyurethane-forming mixture of various additives such as surface-active agents, for example oxyethylated fatty alkyl phenols, oxyethylated fatty alcohols, salts of sulphuric acid derivatives of high molecular weight organic compounds and alkyl and aryl polysiloxanes and copolymers thereof with alkylene oxides, foam-stabilising agents, for example ethyl cellulose, colouring matters, plasticisers, fire-proofing agents, for example tris-2-chloroethylphosphate and tris-2,3-dibromopropyl phosphate and antioxidants.

It has also been found that the mono-quaternary ammonium salts derived from the tertiary amines proposed herein are effective catalysts for polyurethane processes.

Thus, as a further embodiment of the present invention, there is provided a process for the manufacture of polyurethane materials by the reaction of an organic polyisocyanate with an organic polyhydroxy compound characterised in that the reaction is carried out in the presence of a quaternary ammonium salt obtained by reacting one molecular proportion of a tertiary amine of the general formula:

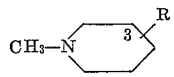

where R has the significance hereinbefore stated with one molecular proportion of a compound of the general formula R'X where R' represents an alkyl, cycloalkyl or aralkyl radical and X represents an atom or group capable of ionising to form the anion of the quaternary ammonium salt.

The compound R'X is preferably an alkyl, cycloalkyl or aralkyl halide, particularly a chloride or bromide but it may also be an alkyl sulphate, particularly methyl or ethyl sulphate.

The quarternary ammonium salts may be prepared by the general methods described in the prior art for such reactions. Thus the tertiary amine and the compound R'X may be reacted together in the proportions stated, at normal or elevated temperatures, optionally in the presence of a solvent for the reactants. The products are monoquaternary ammonium salts containing a tertiary nitrogen atom may be used as catalysts in polyurethane processes using the general methods described in the prior art and particularly those hereinbefore described with reference to the tertiary amines from which the quaternary ammonium salts are derived. They are of particular value in processes where a water-soluble catalyst of low volatility is required.

The invention is illustrated but not limited by the following examples in which all parts are by weight:

*Example 1*

To 100 parts of an oxypropylated glycerol of molecular weight approximately 3000 and hydroxyl value 56 mg. KOH/g. is added 0.5 part of stannous octoate. To this mixture is then added 3.8 parts of a solution comprising 2.9 parts of water, 0.8 part of a siloxane-oxyalkylene copolymer and 0.1 part of 1,1'-dimethyl-4,4'-bipiperidyl. 38 parts of an 80:20 mixture of tolylene-2,4 and 2,6-diisocyanates are rapidly stirred into the blend and the mixture is poured into a mould. A foam forms which cures to give a resilient cellular product having low density and good structure.

*Example 2*

If in the foregoing Example 1 the 1,1'-dimethyl-4,4'-bipiperidyl is replaced by an equal weight of 1-methyl-4-(4'-pyridyl)piperidine a resilient cellular product of low density and good structure is similarly obtained.

*Example 3*

If in the foregoing Example 1 the 1,1'-dimethyl-4,4'-bipiperidyl is replaced by an equal weight of 1,1'-dimethyl-4,2'-bipiperidyl a resilient cellular product of low density and good structure is similarly obtained.

*Example 4*

If in the foregoing Example 1 the 1,1'-dimethyl-4,4'-bipiperidyl is replaced by an equal weight of 1,1'-dimethyl-3,2'-bipiperidyl a resilient cellular product of low density and good structure is similarly obtained.

*Example 5*

100 parts of oxypropylated glycerol of molecular weight approximately 3000 are continuously blended with 44.7 parts of an 80:20 mixture of tolylene-2:4- and 2:6-diisocyanates, 0.3 part of stannous octoate, 3.5 parts of water, 1.0 part of a siloxane-oxyalkylene copolymer, and 0.075 part of 1,1'-dimethyl-4,4'-bipiperidyl and the liquid mixture dispensed on to a moving mould. A length of approximately 30 ft. is continuously produced, the foam having excellent stability during processing. The resultant flexible foam is of fine even texture and has good physical properties.

*Example 6*

100 parts of oxypropylated glycerol of molecular weight approximately 3000 are continuously blended with 49.8 parts of an 80:20 mixture of tolylene-2,4- and 2,6-diisocyanates, 0.325 part of stannous octoate, 4.0 parts of water, 2.0 parts of siloxane-oxyalkylene copolymer, 0.050 part of 1,1'-dimethyl-4,4'-bipiperidyl and 15 parts of trichlorofluoromethane and the liquid mixture dispensed on to a moving mould. A length of approximately 30 ft. is continuously produced, the foam having excellent stability during processing. The resultant flexible foam is of fine even texture, low density and has good physical properties.

Example 7

A mixture comprising 100 parts of oxyproplated trimethylolpropane (hydroxyl value 540 mg. KOH/g.), 2 parts of water, 15 parts of triethanolamine, 38 parts of trichlorofluoromethane, 3 parts of a siloxane-oxyalkylene copolymer and 4 parts of a solution comprising 2 parts of 1,1'-dimethyl-4,4'-bipiperidyl and 2 parts of dipropylene glycol is prepared and then rapidly mixed with 230 part of a diisocyanatodiphenylmethane composition. The mixture is poured into a mould and after 1 minute a rigid foam is obtained with a tack-free surface.

Example 8

A mixture comprising 50 parts of oxypropylated tolylene diamine (hydroxyl value 480 mg. KOH/g.), 50 parts of oxypropylated triethanolamine (hydroxyl value 520 mg. KOH/g.), 30 parts of tris-2-chloroethyl phosphate, 2 parts of water, 3 parts of a siloxane-oxyalkylene copolymer, 33 parts of trichlorofluoromethane and 2 parts of a solution comprising 1 part of 1,1'-dimethyl-4,4'-bipiperidyl and 1 part of dipropylene glycol is prepared and then rapidly mixed with 168 parts of a diisocyanatodiphenylmethane composition. The mixture is poured into a mould and after 90 seconds a rigid foam is obtained with a tack-free surface.

Example 9

10 parts of a polyester prepared from 64 parts of adipic acid, 51 parts of diethylene glycol and 2.3 parts of pentaerythritol having an acid value of 2.9 mg. KOH/g., a hydroxyl value of 76 mg. KOH/g. and a viscosity of 93 poises at 25° C. are stirred with 0.05 part of 1,1'-dimethyl-4,4'-bipiperidyl. 0.95 part of tolylene diisocyanate is then stirred in rapidly and the resultant mixture sets to a non-flowing rubbery composition within 2 minutes. If the 1,1'-dimethyl-4,4'-bipiperidyl is omitted from the above composition the mixture still remains as a viscous syrup after 1 hour.

Example 10

100 parts of a polyester prepared from 228 parts of adipic acid, 177 parts of diethylene glycol and 8.16 parts of pentaerythritol having an acid value of 5 mg. KOH/g., a hydroxyl value of 67 mg. KOH/g. are mixed with 62 parts of a 65:35 mixture of tolylene-2,4- and 2,6-diisocyanates. To this mixture is added with vigorous agitation an activator mixture consisting of 5 parts of water, 0.2 part of 1,1'-dimethyl-4,4'-bipiperidyl, 1 part of a condensate of octylphenol with approximately 7.5 molecular proportions of ethylene oxide, 0.2 part of the disodium salt of sulphated polypropylene glycol (molecular weight 2000) and 0.3 part of a condensate of castor oil fatty acids with 2.5 molecular proportion of ethylene oxide. When the mixture begins to foam it is poured into a mould where it forms a flexible foam.

We claim:

1. A process for the manufacture of polyurethane materials which comprises reacting an organic polyisocyanate with an organic polyhydroxy compound in the presence of a catalytic amount of a tertiary amine of the general formula:

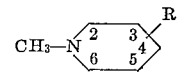

wherein R, which is attached to a carbon atom in the 3 or 4 position, represents a 2'-, 3'- or 4'-pyridyl or a 1'-methyl-2'-, 1'-methyl-3'- or 1'-methyl-4'-piperidyl radical.

2. A process as claimed in claim 1 wherein the tertiary amine is 1,1'-dimethyl-4,4'-bipiperidyl.

3. A process as claimed in claim 1 wherein the tertiary amine is used in the form of a salt of a weak organic acid.

4. A process as claimed in claim 1 wherein the organic polyhydroxy compound is selected from the group consisting of hydroxyl group-containing polyesters, and hydroxyl polyethers.

5. A process as claimed in claim 1 wherein the organic polyisocyanate is reacted with the organic polyhydroxy compound in the presence of at least one gas-generating agent selected from the group consisting of water and halogenated hydrocarbons having boiling points not exceeding 75° C. at atmospheric pressure to produce a foam.

6. A process as claimed in claim 5 wherein the organic polyhydroxy compound has predominantly secondary hydroxyl groups.

7. A process as claimed in claim 5 wherein the tertiary amine is used in conjunction with an organic compound of a metal selected from the group consisting of stannous octoate, dibutyltin dilaurate and lead octoate.

References Cited by the Examiner

UNITED STATES PATENTS 3,109,825  11/1963  O'Mant et al. _____ 260—2.5

DONALD E. CZAJA, *Primary Examiner.*

G. W. RAUCHFUSS, *Assistant Examiner.*